United States Patent Office 2,795,860
Patented June 18, 1957

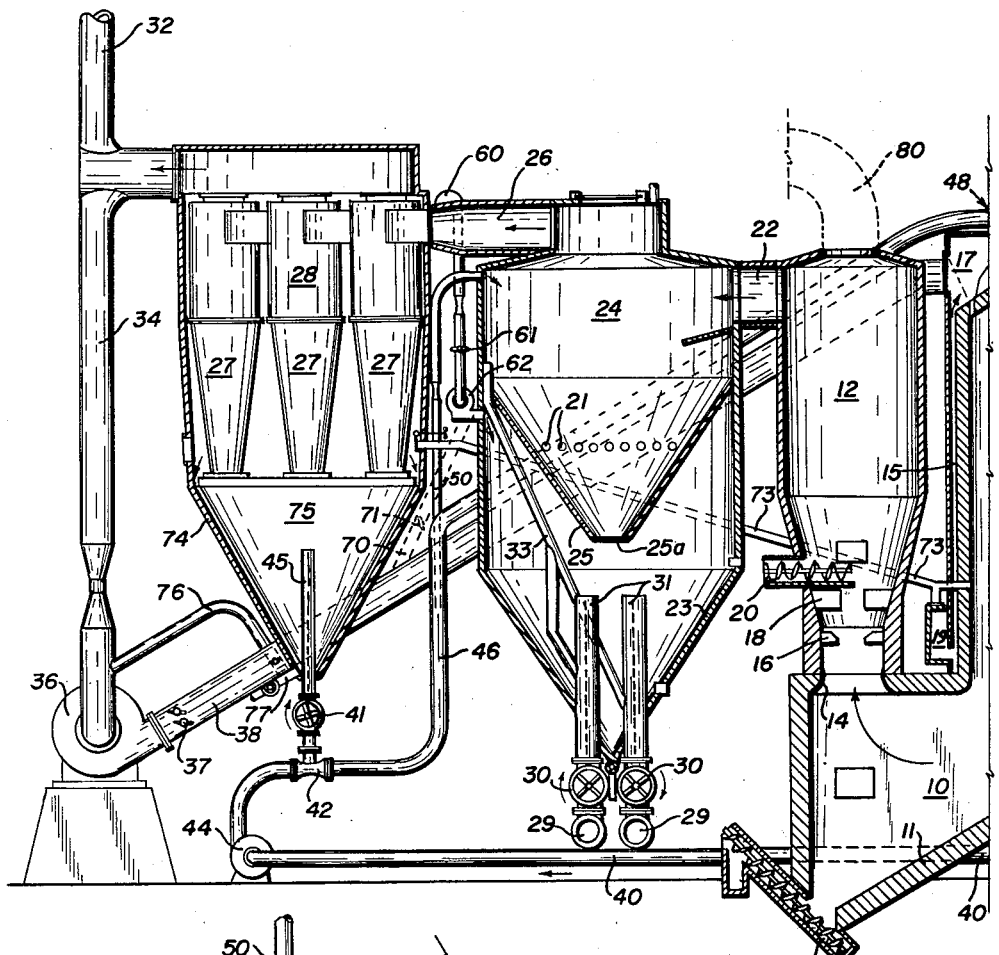
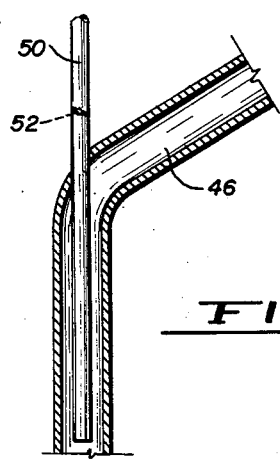
FIG.-1
FIG.-2
INVENTORS.
James C. Wright
B. B. Tyus

2,795,860

METHOD AND APPARATUS FOR FLUIDIZED DRYING

James C. Wright, Denver, Colo., and Billy B. Tyus, Rockdale, Tex.; said Wright assignor to Silver Engineering Works, Inc., a division of Silver Corporation, Denver, Colo., a corporation of Colorado Application November 22, 1954, Serial No. 470,382

9 Claims. (Cl. 34—10)

This invention relates to a method and apparatus for the rapid and continuous drying of finely divided materials by direct heat exchange with hot gases of high velocity and the control thereof. The process and apparatus relates more particularly to a continuous process utilizing hot combustion gases for drying or vaporizing volatile ingredients from carbonaceous fuels, specifically processes for drying low rank coals, and the like. The process of the invention is adapted to achieve these results economically and efficiently.

The present invention provides among its objects and advantages means and methods for economically drying finely divided low rank carbonaceous fuels. The invention also includes means and methods for efficiently utilizing the hot gases of combustion for direct heat exchange with the solid material, and, also, includes novel and efficient control means for the drying apparatus. The invention includes means for substantially separating dust from the dried coal to thereby provide a cleaner, more efficient fuel, and provides means for utilizing the separated dust to generate drying gases. These and other objects and advantages of the present invention may be readily understood by referring to the following description and appended drawings.

In copending application Serial No. 467,942, filed November 10, 1954, for Apparatus and Method of Fluidized Drying of Carbonaceous Fuels, by James C. Wright, there is described apparatus and methods for drying low rank coal. The present application provides an improvement in the apparatus and methods described in said copending case.

In general, the process and apparatus is a drying procedure in which finely divided solids, such as coal, and the like, are entrained in a high velocity stream of dry, hot gas. The type of drying is known as gas entrained drying or the fluid current type. In this type of drying, finely divided materials are suspended and dried in a high velocity stream of hot gas. The dry product is separated from the spent gas ready for use.

The present invention includes means for separating dust from the product and for providing a sufficient quantity of the separated dust for burning in a combustion furnace to generate hot, dry, gaseous products of combustion for drying wet, carbonaceous fuel. Control means are provided to effectively utilize the dust and to adjust the temperature of the hot combustion gases for efficiently drying the wet coal.

Referring to the drawings:

Fig. 1 is an elevational view of a device, in partial section, according to the invention, showing a drying chamber and separators; and Fig. 2 shows a detail of the control means for supplying the necessary amount of fuel to the combustion furnace for generating the hot gases.

As illustrated in Fig. 1, a combustion furnace 10, which is only partly shown, supplies hot gases of combustion for a drying chamber 12. The furnace is supplied with preheated air passing in the jacketed space 15 along the outside of the furnace. The hot gases of combustion from furnace 10 sweep around and enter a drying chamber 12 through throat 14. The hot gases sweeping down the furnace impinge on a bottom wall 11, which reverses the direction of the gases and tends to separate ash and other solid matter entrained in the hot gases. The solid matter falls to the bottom of wall 11 from which it is removed by an ash removal screw 66. As the hot combustion gases enter the drying chamber they are subjected to a swirl effect by vanes 16, and after passing through the vanes 16, the gases are then substantially straightened by a baffle 18. The vanes and the baffle establish a pressure or velocity equalization across the throat area of the drying column which facilitates distribution and entrainment of the solids in the hot gases across the drying column. A feed screw 20 introduces wet coal into the drying chamber directly above the baffles 18. The larger wet coal particles may fall to the swirl means 16 and the baffle means 18, and there the swirling, high velocity gases entrain the wet solids. The smaller, lighter solids are entrained substantially as they leave the feed means.

The solid particles, which includes coal dust, and the spent gas pass out of the drier and are separated by means of the primary separator 24. The gas, which is separated from the solid matter, passes out of the separator 24 through a passage 26 into a secondary or dust separator 28. The separated solid material in the primary separator 24 falls along a conical bottom 25, through opening 25a, into product bin 23. Pneumatic conveyors 29, which are fed by star feeders 30, are adapted to convey the dry coal from the drier to the point of use. A vent 33 is connected to slotted feed inlets 31 to withdraw the dried coal product from the bin.

The primary separator separates a substantial portion of the dust along with the larger coal particles. Since the gas passing out of the primary separator 24 will carry some dust and fine solid particles, a secondary or dust separator 28 is utilized to separate the dust from spent gas. The gas which leaves the secondary separator is partially exhausted through an atmospheric exhaust 32 and partially through a passage 34 which leads to a blower 36. The blower 36 forces spent gas through a conduit 38 into manifold 17 which exhausts into the furnace 10 so that a relatively large volume of noncombustible gases may be recycled into the furnace for reheating. The spent gas adds volume, without adding oxygen, for use in the drying of more solid material in the drying chamber 12. A pair of valves or dampers 37 control the volume of gas passing through the conduit.

Dust which is separated from the spent gas in the secondary separator 28 is utilized as a fuel for the furnace 10 to provide the hot gases of combustion used in the drying process. A flow of gaseous medium, which may be fresh air or spent drying gas, or a mixture of both, from a source not shown, is conveyed along a conduit 40 into the burner at the top of the furnace, not shown. The gaseous medium is propelled along the conduit by a blower or fan 44. A dust bin 75 of the secondary separator feeds the conduit 40 through a star feeder 41 interconnected with a venturi 42 in the conduit. The star feeder draws dust from the secondary separator through a vented feed tube 45 into the venturi, where it is admixed with the gaseous medium passing through the conduit. The blower or fan 44 blows the mixture of the dust and air along a conduit 46 to a burner at the top of the furnace at 48.

A portion of the spent gas may be recycled to the furnace by the duct 38, which adds volume and substantially noncombustible material to the drying gas. The resultant mixture of spent gas and products of combustion supplies a large quantity of hot gas for drying, containing very little gas capable of supporting combustion of the material to be dried. This may be very important due to the fact that, normally, the coal being quite fine in the presence of oxygen may produce an explosive mixture as the coal dries. By recycling a portion of the spent gases, it is, also, possible to provide a preheated drying gas available for use in drying the wet coal, and yet which will not be capable of supporting combustion.

The dry dust bin 75 is maintained substantially empty, that is, dust is removed as soon as it settles so that it does not accumulate or pile up. If the dust is permitted to pile up, it will not properly charge into the conduit 46 leading into the furnace. By withdrawing the dust as it settles in the bin, however, the dust is withdrawn at a uniform rate, maintaining the bin in an "empty" condition.

Due to the explosive nature of the dried product, it is very important that close controls be maintained on all phases of the process. It is especially important to provide the only exact requirement of dust for combustion in the furnace so as to provide a drying gas of correct temperature and correct mixture of noncombustible gas material. Only the requisite amount of dust for combustion is fed into the furnace, any excess is returned to the primary separator. When an excess of dust required for combustion is passed into the secondary separator from the primary separator, a dust circulation system is provided. The circulating dust system is from the primary separator to the secondary separator and back into the primary separator.

In order to provide only the necessary amount of dust for the furnace through conduit 46, a by-pass 50 is inserted in the line 46. The by-pass 50 returns dust into the primary separator 24. The by-pass 50 is a vertical, concentric pipe placed in the center of a vertical section of conduit 46. The by-pass or pick-off 50 must be substantially centered in a vertical conduit to provide a uniform portion of the dust passing therethrough. The vertical pick-off bypasses a homogeneous portion of the solids passing through the conduit so as to maintain a balance of the various sizes of pieces of dried dust. The amount of coal dust withdrawn from the conduit 46 or, in effect, the amount of dust fed to the furnace is controlled by the damper 52 in the by-pass 50. Withdrawal of the coal dust from the conduit 46 reduces the amount of combustible material available in the furnace, and provides a means for controlling the temperature of the products of combustion.

To ensure an adequate supply of circulating dust, and to also supply a clean coal product containing a minimum of dust, a by-pass 60 extending from primary separator outlet 26 through a blower 62 exhausts back into the primary separator 24 under the conical baffle or bottom 25. The pressure in the primary separator is substantially the same as in outlet 26, so the blower 62 is required to force gas into the separator. A damper or valve 61 controls the amount of gas being recycled into the separator 24. The by-passed spent gas, passing through the settling dust and solid particles, upsets settled solids and separates a substantial portion of the dust from the product. The dust is resuspended in the gas and carried into the secondary separator, and the clean coal product settles in bin 23. The recycled gas passes through opening 25a in the bottom of cone 25 and through gas ports 21 in cone 25 to contact the settling solids. Thus, fines and dust are separated from the product in the primary separator and are resuspended in the exhausting separated spent gas, along with recycled dust, to form the circulating dust system. The circulating dust and spent gases from the primary separator 24 are passed into secondary or dust separator 28 where the dust is separated from the spent gas in the dust cyclones 27. The dust is fed into the conduit 46 substantially as fast as it settles in the bin, to maintain the bin "empty." The amount of dust by-passed from conduit 46 and returned to separator 24 maintains the proper ratio of fuel fed to the burner 48 of the furnace.

For certain installations, it may be desirable to have a top outlet 80 extending from the top of the drying chamber 12 instead of a side outlet 22. Such an outlet may be curved to form a tangential inlet for a primary separator. By using the curved top outlet, less resistance may be encountered in the curved exhaust sweep for the hot gas than in the sharp bend of the outlet 22. With certain types of material, the reduced resistance may be desirable.

In the operation of the furnace 10 a certain amount of fresh air may be taken in a manifold 19, not completely shown, around the periphery of the furnace and conveyed up an annular space 15 surrounding the furnace and extending up to the top thereof. The fresh primary air is thus preheated prior to the entry into the furnace. The heating in chamber 15 provides an economizer for the fresh air, and, further, prevents chilling of the furnace by the entering fresh air.

In certain instances, it may be desirable to utilize a by-pass from the recycle duct 38 instead of from the exhaust 26 of the primary separator. In such a case, a by-pass 70, controlled by a valve or damper 71, conveys spent gas through the fan 62 back into the primary separator 24. As the pressure in duct 38 is greater than the pressure in the primary separator, due to the blower 44, the by-pass 70 may be passed directly into the separator 24. The by-passed spent gas in either case upsets the dust and product to resuspend the dust and provide the circulating dust system.

The spent gas from the drying process may contain a substantial amount of moisture and it may be necessary, especially in starting, to heat the secondary separator to prevent condensation of the moisture. The secondary separator 28 is heated by hot gas from furnace 10 by means of a conduit 73. The gas in the separator 28 heats the separators 27 and passes down around bin 75 in the space between the bin and the conical separator bottom 74 and out through an outlet 77. The outlet 77 communicates with a conduit 76 which exhausts into the suction side of fan 36.

The circulating dust system provides a ready and positive source of fuel for the combustion furnace. The dust system, since it includes a direct communication with the furnace, provides a fast, efficient control of the fuel entering the furnace. Furthermore, the substantially dustless product is a more satisfactory and efficient fuel.

While the invention has been illustrated by reference to a specific device, there is no intent to limit the invention to the details so described, except insofar as set forth in the following claims.

We claim:

1. A gas entrained drier for finely divided coal comprising a furnace adapted to burn fuel dust for generating hot drying gas, drying chamber means for suspending wet, finely divided, carbonaceous fuel in a high velocity stream of hot drying gas, a first separator means for separating dried product from spent gas exhausting from said drying chamber means, a second separator means for separating dust from spent gases from said first separator, means for circulating dust from said second separator into said first separator, and means for withdrawing dust from said circulating means to supply fuel for said furnace.

2. A gas entrained drier for finely divided coal comprising furnace means adapted to burn fuel dust for generating hot drying gases, drying chamber means for suspending wet, finely divided, carbonaceous fuel in a high velocity stream of hot drying gases, a first separator means for separating dry product from the mixture exhausting from said drying chamber, a second separator means for separating dust from the mixture exhausting from said first separator means, means for circulating dust from said second separator into said first separator means, means for upsetting dried product and dust in said first separator means to pass dust from said first separator means, and means for withdrawing dust from said circulating means to supply fuel for said furnace.

3. A gas entrained drier for finely divided coal comprising furnace means for burning coal dust for generating hot drying gases, drying chamber means for suspending wet coal in a high velocity stream of hot drying gas, a first separator means for separating dry dust and dry product from spent drying gas, means for recycling a portion of separated spent gas into said separated dust and product to upset the same and entrain a portion of the dust in said separated spent gas, means for separating the dust from said spent gas, means for suspending said separated dust in a portion of gaseous medium for delivery into said furnace means, and means for by-passing dust in excess of the quantity required for combustion in said furnace means into said first separator means.

4. A gas entrained drier for finely divided coal comprising furnace means for burning coal dust for generating hot drying gases, drying chamber means for suspending wet coal in a high velocity stream of hot drying gas, a first separator means for separating dry dust and dry product from spent drying gas, means for recycling a portion of separated spent gas into said separated dust and product to upset the same and entrain a portion of the dust in said separated spent gas, means for separating the dust from said spent gas, means for suspending said separated dust in a gaseous medium for delivery into said furnace means, and means inclusive of a vertical interceptor conduit for by-passing a portion of the dust suspended in said gaseous medium in excess of the quantity required for combustion in said furnace means into said first separator means.

5. A gas entrained drier for finely divided coal comprising furnace means for burning coal dust for generating hot drying gases, drying chamber means for suspending wet coal in a high velocity stream of hot drying gas, a first separator means for separating dry dust and dry product from spent drying gas, means for recycling a portion of separated spent gas into said separated dust and product to upset the same and entrain a substantial portion of the dust in said separated spent gas, a second separator means for separating the dust from said spent gas, means for passing a portion of gaseous medium into said furnace means, means for suspending separated dust from said second separator means in said gaseous medium, and means inclusive of a vertical interceptor conduit for by-passing into said first separator means suspended dust in said gaseous medium in excess of the quantity required for combustion in said furnace means.

6. A method of drying carbonaceous fuels comprising suspending finely divided fuel in a high velocity stream of hot drying gas, separating dried dust and product from spent drying gas, recycling a portion of spent gas into the separated dust and product whereby to resuspend a portion of dust in the spent gas, separating said resuspended dust from the spent gas, suspending said separated dust in a gaseous medium for conveying into a combustion furnace for generating hot drying gas, and by-passing dust in excess of the quantity required for combustion for generating said gases.

7. A method of drying carbonaceous fuels comprising suspending finely divided fuel in a high velocity stream of hot drying gas, separating dried dust and dried product from spent drying gas, recycling a portion of separated spent gas into separated dust and product whereby to suspend a portion of dust in the spent gas, separating dust from the spent gas, suspending said separated dust into a portion of gaseous medium for conveying into a combustion furnace for generating hot drying gas, and by-passing dust in excess of the quantity required for combustion for generating said gases, said by-passed dust being returned to said separated dried dust and dried product.

8. A method of controlling a drying system in which a combustion furnace burning dried coal dust provides hot drying gas for a gas entrained drying chamber and in which dried product and dust are separated from spent drying gas exhausting from said gas entrained drier, comprising recycling a portion of said spent drying gas back into said separator for upsetting said product and dust whereby to resuspend dust in the spent gas exhausting from said separator, separating the dust from said spent gas, passing a gaseous medium into said combustion furnace, suspending said separated dust into said gaseous medium for delivery to said furnace, and by-passing dust in excess of the quantity required for combustion in the furnace back into said separating means.

9. Apparatus for controlling a drying system in which a combustion furnace burning dried coal dust provides hot drying gases for a gas entrained drying chamber and in which dried product and dust are separated from spent drying gas exhausting from said gas entrained drier, comprising means for recycling a portion of said spent drying gas back into a dust and product separator for upsetting said separated product and dust whereby to resuspend dust in the spent gas exhausting from said separator, the amount of dust resuspended being in excess of the requirements of combustion in said combustion furnace, dust separator means for separating dust from said spent gas, means for passing a portion of gaseous medium into said combustion furnace, means for suspending said separated dust into said gaseous medium for delivery to said furnace, and means for returning the resulting suspended dust in excess of the quantity required for combustion in the furnace into said dust and product separator.

References Cited in the file of this patent
UNITED STATES PATENTS

| | | |
|---|---|---|
| 1,675,941 | Lindsay | July 3, 1928 |
| 1,756,960 | Stebbins | May 6, 1930 |
| 2,211,274 | Kuck | Aug. 13, 1940 |
| 2,638,684 | Jukkola | May 19, 1953 |
| 2,666,269 | Parry | Jan. 19, 1954 |